Figure 1:
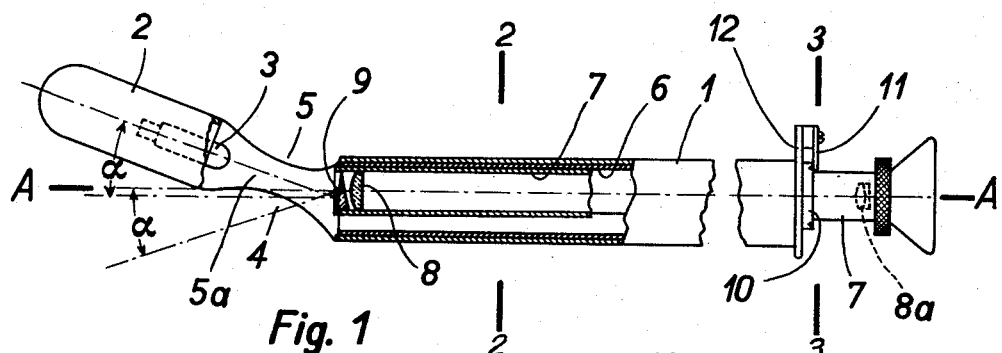

Aug. 20, 1940.                R. WOLF                 2,212,484
       TELESCOPIC INSTRUMENT FOR THE EXAMINATION OF BODY CAVITIES
                        Filed April 9, 1940

Inventor:

Patented Aug. 20, 1940

2,212,484

UNITED STATES PATENT OFFICE 2,212,484

TELESCOPIC INSTRUMENT FOR THE EXAMINATION OF BODY CAVITIES

Richard Wolf, Berlin, Germany, assignor to the firm Georg Wolf G. m. b. H., Berlin, Germany Application April 9, 1940, Serial No. 328,674
In Germany April 12, 1939

4 Claims. (Cl. 128—7)

Application has been filed in Germany, April 12, 1939.

The invention relates to instruments for examining body cavities and in particular to urethroscopes where the front end of the sheath—which usually carries a lamp—is somewhat bent sideways. In instruments of this kind that side of the sheath towards which the front end is bent is known to be provided with a window-like opening through which, by means of an optical tube introducible into the said sheath, observations of the respective body cavity can be carried out, whereupon the respective auxiliary instruments such as diathermic electrodes, electrocauter, etc. are introduced through the sheath. In the known types of instruments the objective end of the optical system usually was so constructed that the object was observed at a right angle to the sheath. This known type of instruments was of disadvantage in that observation was permitted only towards one side through the opening.

In order to obtain as full a view as possible through the instruments in question it is suggested according to the present invention that the bent forward end is provided with two oppositely situated openings one of which lies towards that particular side towards which the forward end is bent, and that the objective of the optical tube be combined with a prismatic part whose principal section coincides with the axis of the optical tube and which deflects the optic axis of this tube by approximately the same amount by which the front of the sheath is bent towards the side. If in addition to this, the optical tube is rendered rotatable about its axis, as suggested by the present invention, that part of the optic axis of the optical tube lying in front of the objective will in a certain position of the optical tube about coincide with the axis-direction of the front part of the sheath and permit observation through both openings of that part. After rotating the optical tube from the first position by 180°, observation will be possible in a different direction varying by twice the deviating angle of the prismatic part. The latter may be combined with an objective-lens to form one unit. It will be particularly advantageous however to have the prismatic part form an independent deviation-wedge disposed in front of the objective.

It will be advantageous to provide two rests on the instrument indicating the two respective positions of the optical tube.

Figures 2, 3:
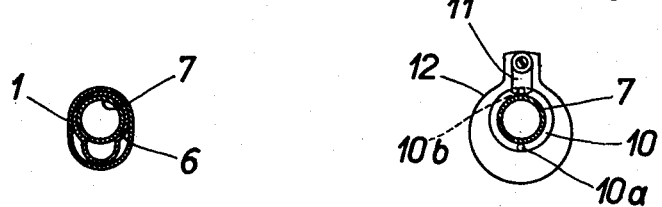
Figure 4:
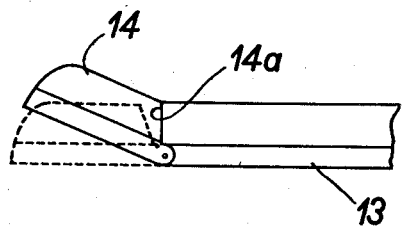

A constructional example of the invention is illustrated by the accompanying drawing, viz:

Fig. 1 showing a urethroscope partly in lateral view and partly longitudinal section, Fig. 2 cross section on the line 2—2 in Fig. 1, Fig. 3 cross section on the line 3—3 in Fig. 1, Fig. 4 lateral view of the front end of a mandrel to be introduced into the sheath.

The instrument illustrated in the drawing consists of a sheath 1 with a forward part 2 bent at an angle α and containing a lamp 3. The bent sheath end is provided with two openings 4 and 5 whose size is such that only two opposing bridges 5a remain between the openings. Within the sheath 1 a slideway sleeve 6 is disposed through which an optical tube 7 can be passed and removed in known fashion. The optical system of tube 7 contains an objective 8 and an eyepiece 8a both of which lie centrically relative to the axis A—A of the optical tube 7. In front of the objective 8 an optical wedge 9 is disposed which deviates the optic axis of the optical tube 7 downward by the angle α shown in Fig. 1. Thus in the position of the optical tube 7 shown in Fig. 1 a body cavity can be observed through the opening 4 in an obliquely downward direction. When rotating the optical tube 7 by 180° the axial ray of the observing pencil of rays approximately coincides with the axis of the end 2 of the sheath thus permitting the body cavity to be observed through the two opposing openings 4 and 5.

To indicate the said two positions of the optical tube 7 a collar 10 of this tube is provided with two rests 10a and 10b which coact with an elastic arresting shoulder 11 attached to a collar 12 of sheath 1.

In order to close the two openings 4 and 5 to prevent their edges from causing injuries when introducing the instrument into the body cavity a special mandrel 13 (Fig. 4) is passed into the slide tube 6. This mandrel 13 is provided with a pivotally mounted forward end 14 which fills out the two openings 4 and 5. With advantage this forward end is elastically attached to the mandrel 13 in such a manner that it tends to occupy the position illustrated in Fig. 4. It is provided with an arresting shoulder 14a which in this end position rests against the main part of the mandrel whereby it coincides with the angular position of the sheath-end 2.

I claim:

1. In a telescopic instrument for surgical purposes, a sheath and an optical tube, this tube being disposed within this sheath rotatable about its longitudinal axis, an objective and an eyepiece located within said optical tube, the objective being in axial alignment with said eyepiece, the forward end of the said sheath being bent at a certain angle relative to the longitudinal direction of the sheath and provided with two diametrically opposed viewing apertures one of which faces that respective side towards which the forward end is bent, an optical prismatic part being firmly connected with the optical tube and combined with said objective in such a manner that the main section of this prismatic part coincides with the axis of said optical tube and that the optic axis of the optical tube is deviated by the said prismatic part by about the same angle, the axis of the said forward part of the sheath forms with the longitudinal direction of the sheath.

2. In a telescopic instrument according to claim 1, a deviation wedge being disposed in front of the objective of the said optical tube and forming the said prismatic part.

3. In a telescopic instrument according to claim 1, two rests to indicate those positions of the said optical tube in the said sheath in one of which that part of the optic axis deviated from the longitudinal axis of the optical tube coincides with the axis of the said forward part of the shaft, whilst in the other position the optical tube within the sheath is rotated by 180° relative to the first position.

4. A mandrel for an instrument according to claim 1, being introducible into the said sheath with its forward end being pivotally mounted to the remaining part of the mandrel about an axis crossing the longitudinal axis of the mandrel at right angles.

RICHARD WOLF.